(12) United States Patent
Lee et al.

(10) Patent No.: US 11,327,609 B2
(45) Date of Patent: May 10, 2022

(54) DISPLAY DEVICE

(71) Applicant: Samsung Display Co., Ltd., Yongin-si (KR)

(72) Inventors: Choon Hyop Lee, Yongin-si (KR); Jung Mok Park, Yongin-si (KR); Hee Woong Park, Yongin-si (KR); Sang Wook Yoo, Yongin-si (KR); Ga Yeon Yun, Yongin-si (KR); Jeong Heon Lee, Yongin-si (KR); Byeong Kyu Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 254 days.

(21) Appl. No.: 16/166,180

(22) Filed: Oct. 22, 2018

(65) Prior Publication Data
US 2019/0332200 A1    Oct. 31, 2019

(30) Foreign Application Priority Data

Apr. 26, 2018 (KR) .......................... 10-2018-0048607

(51) Int. Cl.
*G06F 3/044* (2006.01)
*G02B 5/30* (2006.01)

(52) U.S. Cl.
CPC .............. *G06F 3/044* (2013.01); *G02B 5/30* (2013.01); *G06F 2203/04103* (2013.01); *G06F 2203/04111* (2013.01)

(58) Field of Classification Search
CPC ...... G06F 3/044; G06F 3/0443; G06F 3/0445; G06F 3/0446; G06F 3/041; G06F 3/0412; G06F 3/04164; G09G 3/20; G09G 5/003; G02B 1/14

USPC .......................................................... 345/174
See application file for complete search history.

(56) References Cited

U.S. PATENT DOCUMENTS

| | | | |
|---|---|---|---|
| 8,717,321 B2 | 5/2014 | Kim | |
| 8,890,830 B2 * | 11/2014 | Choi | ..................... G06F 3/0443 345/173 |
| 9,465,462 B2 * | 10/2016 | Jeong | ...................... G06F 3/041 |
| 9,820,340 B2 | 11/2017 | Lee et al. | |
| 9,921,414 B2 | 3/2018 | Kwon et al. | |

(Continued)

FOREIGN PATENT DOCUMENTS

| KR | 10-2013-0017745 | 2/2013 |
|---|---|---|
| KR | 10-2016-0027679 | 3/2016 |

(Continued)

*Primary Examiner* — Fred Tzeng
(74) *Attorney, Agent, or Firm* — H.C. Park & Associates, PLC (57) ABSTRACT

A display device including a display panel having a display area and a non-display area disposed around the display area; a touch sensor disposed on the display panel, the touch sensor comprising a sensing area corresponding to the display area, a peripheral area corresponding to the non-display area, and a pad unit disposed on a part of the peripheral area; a flexible printed circuit board disposed on the touch sensor in the peripheral area and connected to the pad unit; a polarization layer disposed on the touch sensor and a part of the flexible printed circuit board; and a printed layer disposed on at least an area between the flexible printed circuit board and the sensing area.

13 Claims, 8 Drawing Sheets

(56) References Cited

U.S. PATENT DOCUMENTS

| | | | | |
|---|---|---|---|---|
| 2011/0134056 A1* | 6/2011 | Kim | ................. | G06F 3/0446 |
| | | | | 345/173 |
| 2011/0316803 A1* | 12/2011 | Kim | ................. | G06F 3/0446 |
| | | | | 345/173 |
| 2012/0007830 A1* | 1/2012 | Liao | ................ | G06F 3/04164 |
| | | | | 345/174 |
| 2012/0127092 A1* | 5/2012 | Lee | ............... | G06F 3/044 |
| | | | | 345/173 |
| 2012/0127095 A1* | 5/2012 | Jun | ............... | G06F 3/044 |
| | | | | 345/173 |
| 2014/0168139 A1* | 6/2014 | Ku | ............... | G09G 3/20 |
| | | | | 345/174 |
| 2014/0168530 A1 | 6/2014 | Lin | | |
| 2014/0204285 A1* | 7/2014 | Jang | ................. | G06F 3/0445 |
| | | | | 349/12 |
| 2015/0084888 A1* | 3/2015 | Han | ................. | G06F 3/0412 |
| | | | | 345/173 |
| 2015/0286325 A1* | 10/2015 | Kim | ............... | G06F 3/044 |
| | | | | 345/174 |
| 2016/0062516 A1 | 3/2016 | Jeong et al. | | |
| 2016/0195965 A1* | 7/2016 | Kim | ................. | G09G 5/003 |
| | | | | 345/173 |
| 2016/0372701 A1* | 12/2016 | Kwon | ................. | G02B 1/14 |

FOREIGN PATENT DOCUMENTS

| | | |
|---|---|---|
| KR | 10-2016-0038561 | 4/2016 |
| KR | 10-2016-0070211 | 6/2016 |
| KR | 10-2017-0000030 | 1/2017 |

* cited by examiner

DISPLAY DEVICE

CROSS-REFERENCE TO RELATED APPLICATION

This application claims priority from and the benefit of Korean Patent Application No. 10-2018-0048607, filed on Apr. 26, 2018, which is hereby incorporated by reference for all purposes as if fully set forth herein.

BACKGROUND

Field

Exemplary embodiments of the invention relate generally to a display device.

Discussion of the Background

As the information-oriented society has developed in recent years, demands in the display field are increasing in various forms. In response thereto, various flat panel display devices, e.g., a liquid crystal display device, a plasma display device, and an organic light is emitting diode display device, which have advantageous features such as thinness, light weight, and low power consumption, have been studied.

A touch sensor is an input device for selecting an instruction displayed on a screen of a display device or the like with a human hand or an object and inputting a command of a user. Generally, the touch sensor includes sensing electrodes, sensing lines connected to the sensing electrodes, and a pad unit connected to the sensing lines, and can recognize a touch event generated in a sensing area as an input signal.

The display device including the touch sensor trends toward a minimization in the area of a non-display area. However, when a flexible printed circuit board ("FPCB") is mounted on a peripheral area of the touch sensor, a non-display area (bezel part) having a predetermined width is required. Therefore, studies have been made to minimize the non-display area of the display device, while securing a clear and sharp display area.

The above information disclosed in this Background section is only for understanding of the background of the inventive concepts, and, therefore, it may contain information that does not constitute prior art.

SUMMARY

Exemplary embodiments of the present invention provide a display device for preventing the visibility of bubbles generated from a laminated structure of a flexible printed circuit board ("FPCB") and a polarizing layer.

Additional features of the inventive concepts will be set forth in the description which follows, and in part will be apparent from the description, or may be learned by practice of the inventive concepts.

An exemplary embodiment of the invention provides a display device including a display panel having a display area and a non-display area disposed around the display area; a touch sensor disposed on the display panel, the touch sensor including a sensing area corresponding to the display area, a peripheral area corresponding to the non-display area, and a pad unit disposed on a part of the peripheral area; a flexible printed circuit board disposed on the touch sensor in the peripheral area and connected to the pad unit; a polarization layer disposed on the touch sensor and a part of the flexible printed circuit board; and a printed layer disposed on at least an area between the flexible printed circuit board and the sensing area.

The printed layer may be disposed on the polarization layer.

The printed layer may be disposed between the display panel and the touch sensor.

The printed layer may be disposed between the touch sensor and the polarization layer.

The printed layer may be extended to an outside of the polarization layer.

The printed layer may be extended to an area corresponding to sensing lines disposed on the peripheral area.

Another exemplary embodiment of the invention provides a display device including a display panel having a display area and a non-display area disposed around the display area; a touch sensor disposed on the display panel, the touch sensor including a sensing area corresponding to the display area, a peripheral area corresponding to the non-display area, and a pad unit disposed on a part of the peripheral area; a flexible printed circuit board disposed between the display panel and the touch sensor in the peripheral area and connected to the pad unit; a polarization layer disposed on the touch sensor; and a printed layer disposed on at least an area between the flexible printed circuit board and the sensing area.

The printed layer may be disposed on the polarization layer.

The printed layer may be disposed between the display panel and the touch sensor.

The printed layer may be disposed between the display panel and the touch sensor.

The printed layer may be extended to an outside of the polarization layer.

The printed layer may be extended to an area corresponding to sensing lines disposed on the peripheral area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter is individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
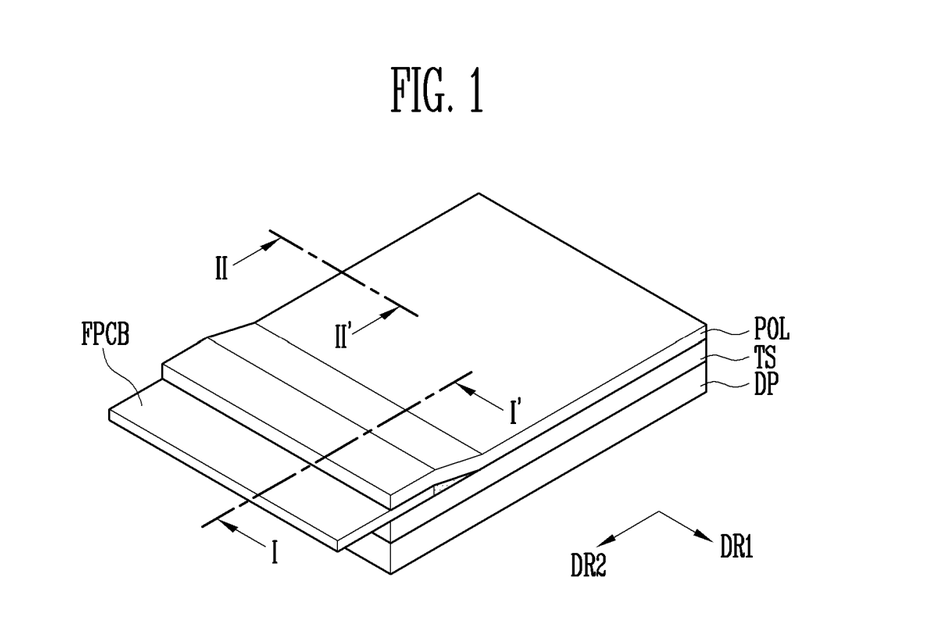
FIG. 1 is a perspective view of a display device according to an exemplary embodiment of the present invention.
Figure 2:
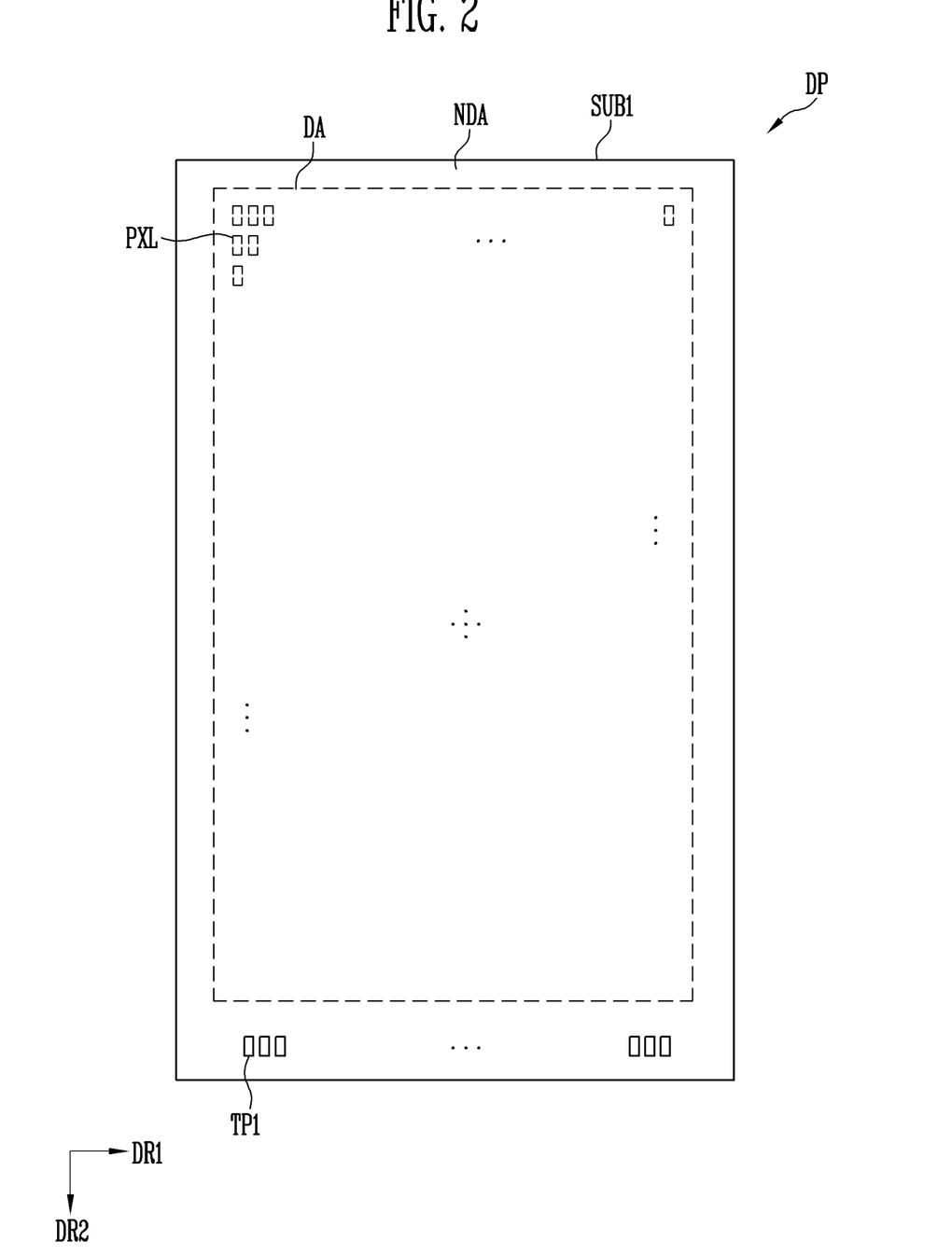
FIG. 2 is a plan view for explaining a display panel of FIG. 1.
Figure 3:
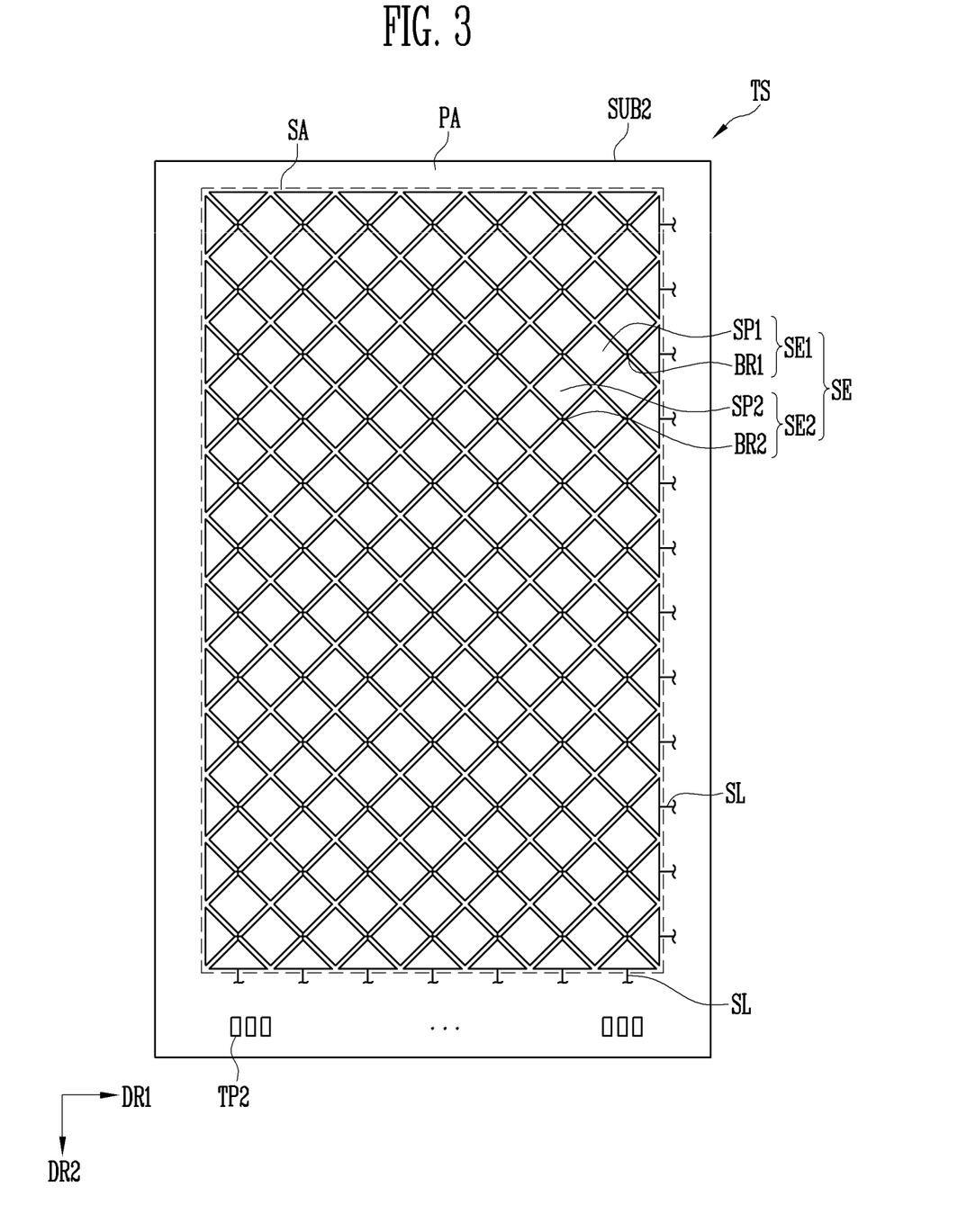
FIG. 3 is a plan view for explaining a touch sensor of FIG. 1.
Figure 4:
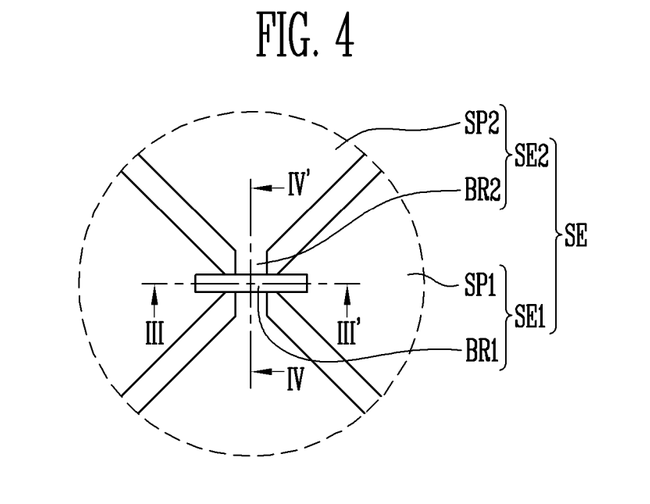
FIG. 4 is a plan view showing an enlargement of a sensing electrode of FIG. 3.
Figure 5:
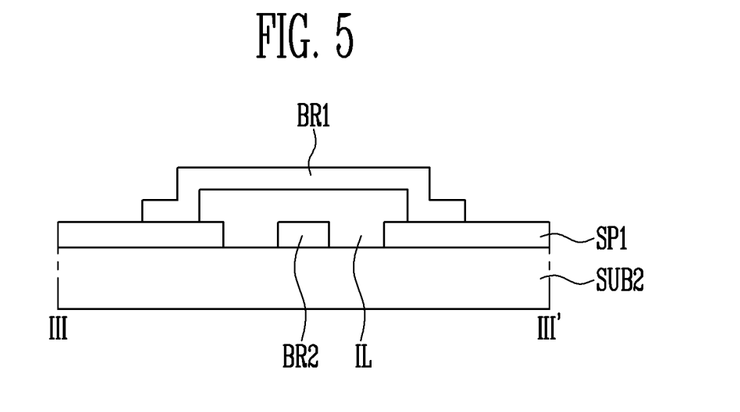
FIG. 5 is a cross-sectional view taken along line III-III' of FIG. 4.
Figure 6:
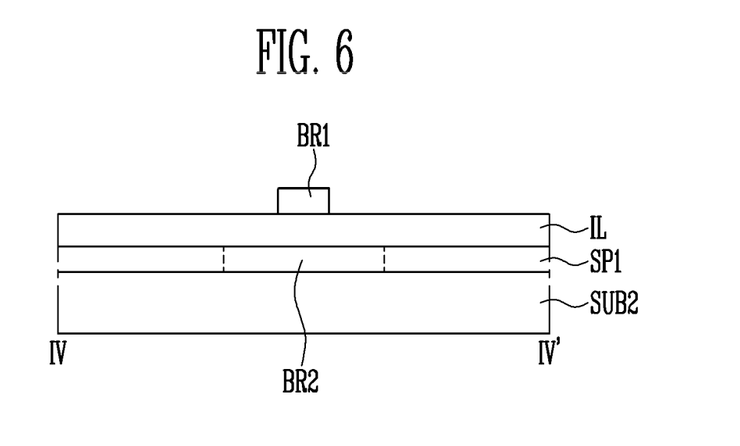
FIG. 6 is a cross-sectional view taken along line IV-IV' of FIG. 4.
Figure 7:
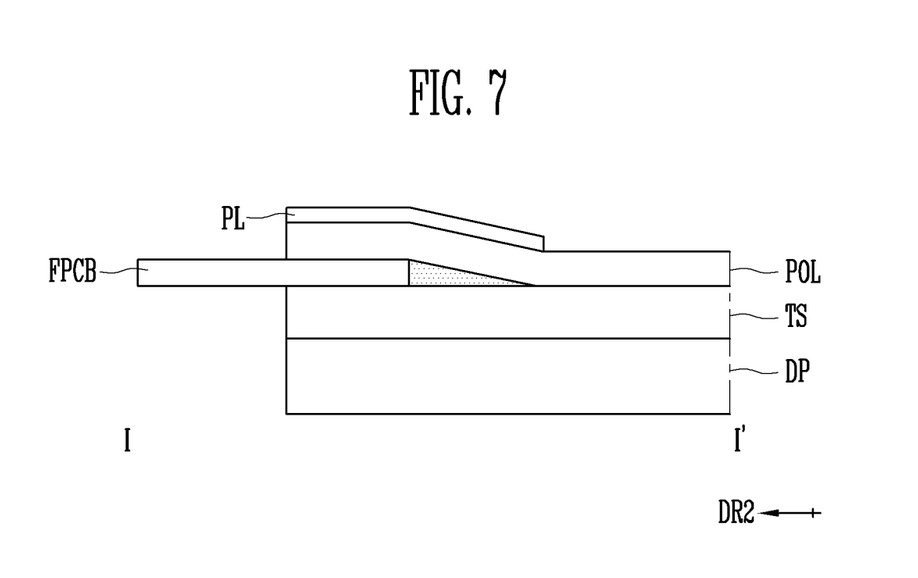
FIG. 7 is a cross-sectional view taken along line I-I' of FIG. 1.
Figure 8:
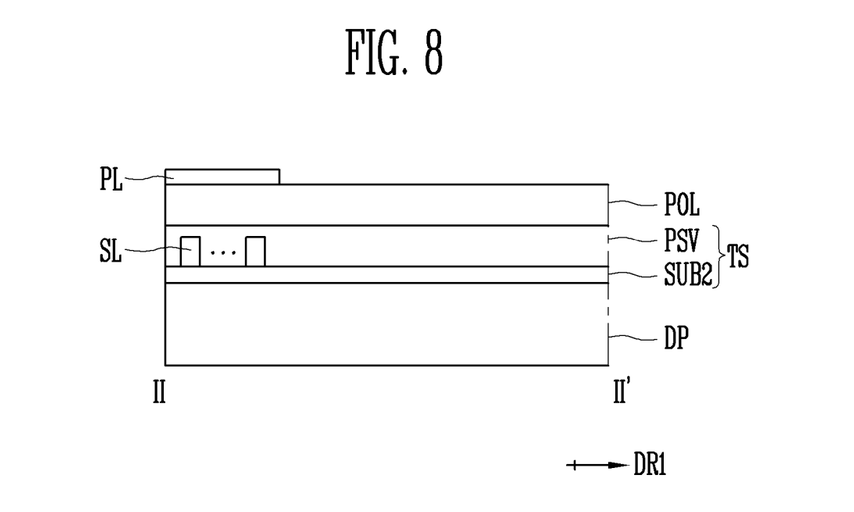
FIG. 8 is a cross-sectional view taken along line II-II' of FIG. 1.

FIG. 1 is a perspective view of a display device according to an exemplary embodiment of the invention. FIG. 2 is a plan view for explaining a display panel of FIG. 1, and FIG. 3 is a plan view for explaining a touch sensor of FIG. 1. FIG. 4 is a plan view showing an enlargement of a sensing electrode of FIG. 3, and FIG. 5 and FIG. 6 are cross-sectional views taken along line III-III' and IV-IV' of FIG. 4, respectively. FIG. 7 is a cross-sectional view taken along line I-I' of FIG. 1, and FIG. 8 is a cross-sectional view taken along line II-II' of FIG. 1.

Referring to FIGS. 1 to 8, the display device according to an exemplary embodiment of the invention may be provided in various forms, for example, in the form of a rectangular plate having two pairs of parallel sides. In the case where the display device is provided in the form of a rectangular plate, one of the two pairs of sides may be longer than the other.

In an exemplary embodiment, the display device having a rectangular form with a pair of long sides and a pair of short sides is illustrated as an example for the sake of explanation. The direction in which the short sides extend is a first direction DR1, and the direction in which the long sides extend is a second direction DR2.

The display device may include a display panel DP provided with display elements (not shown) for displaying an image, a touch sensor TS configured to recognize a touch, a flexible printed circuit board ("FPCB") printed with a circuit for driving the display device, and a polarization layer POL selectively transmitting incident light.

The display device may comprise a display area DA on which an image generated from the display panel DP is displayed, a non-display area NDA disposed in at least one side of the display area DA, a sensing area SA configured to sense a touch of a user and/or a pressure of the touch on the touch sensor TS, and a peripheral area PA disposed in at least one side of the sensing area SA. The sensing area SA may correspond to the display area DA, and the peripheral area PA may correspond to the non-display area NDA. The area of the sensing area SA may be substantially equal to or different from that of the display area DA corresponding thereto.

The display panel DP may display arbitrary visual information, e.g., a text, a video, a photograph, and a two-dimensional or three-dimensional image. Hereinafter, the arbitrary visual information will refer to an "image". The type of the display panel DP is not particularly limited as long as it displays an image.

The display panel DP may include a first substrate SUB1 having the display area DA and the non-display area NDA. The display area DA may be disposed in a central portion of the display panel DP and may have an area relatively greater than that of the non-display area NDA.

The display area DA may include a plurality of pixel areas each of which is provided with a plurality of pixels PXL. The non-display area NDA may be provided around the display area DA. According to an exemplary embodiment, the non-display area NDA may be formed on at least one side of the display area DA, or may be formed along the periphery of the display area DA. The non-display area NDA may be provided with a first pad unit TP1 connected to data lines. A data driver (not shown) and a gate driver (not shown) may be provided outside the non-display area NDA to provide data signals to the pixels PXL. Although not shown specifically for the sake of convenience, the data driver may be provided with a timing controller, a light-emitting driver, and a scan driver.

The first substrate SUB1 may be made of a flexible material, for example, a film or and a plastic material including a polymeric organic material. For example, the flexible material may include one of polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), triacetate cellulose (TAC) and cellulose acetate propionate (CAP), but the inventive concepts are not limited thereto.

The first substrate SUB1 may be made of a rigid material substrate, for example, glass, quartz, glass ceramic or crystalline glass, but is not limited thereto.

The first substrate SUB1 may have a flat surface, and may be formed in a polygonal, circular, or elliptical shape. However, the shape of the first substrate SUB1 is not limited thereto, and may be modified if necessary.

The first substrate SUB1 may include a plurality of signal lines (not shown) connected to the plurality of pixels PXL, and a plurality of thin-film transistors (not shown) connected to the plurality of signal lines.

Each of the plurality of pixels PXL may be an organic light-emitting element including an organic layer, but other types of elements may be used. For example, the pixels PXL may be embodied in various forms such as a liquid crystal element, an electrophoretic element, and an electro-wetting element. The plurality of pixels PXL may be provided in the display area DA of the first substrate SUB1, and each pixel PXL may be provided as a minimum unit for displaying an image in a plurality. The pixel PXL may include an organic light-emitting element which emits white light and/or color light. Each pixel PXL may emit any one color of red, green and blue, but is not limited thereto. For example, each pixel PXL may emit a color such as cyan, magenta, yellow, or the like. Each pixel PXL may include a thin-film transistor (not shown) connected to a line unit (not shown) and an organic light-emitting element connected to a thin-film transistor (not shown).

The touch sensor TS may be disposed on a surface of the display panel DP, or may be integrally formed with the display panel DP. For example, in an exemplary embodiment, the touch sensor TS is disposed on a top surface of the display panel DP.

The touch sensor TS may include a second substrate SUB2 including the sensing area SA and the peripheral area PA.

The second substrate SUB2 may be formed of a flexible material or a rigid material. The second substrate SUB2 may be provided in a substantially identical shape corresponding to that of the first substrate SUB1. The area of the second substrate SUB2 may be the same as, or different from, the first substrate SUB1.

The touch sensor TS may include sensing electrodes SE provided in the sensing area SA, sensing lines SL provided in the peripheral area PA and respectively connected to the sensing electrode SE, and a second pad unit TP2 connected to the sensing lines SL.

The sensing electrodes SE may recognize a touch event of a finger of the user or a separate touch input device on the display device. In an exemplary embodiment, the sensing electrodes SE may be operated by a mutual capacitance method. The mutual capacitance method senses a change in capacitance by interaction between two adjacent sensing electrodes. In addition, the sensing electrodes SE may be operated by a self-capacitance method. The self-capacitance method is conducted by using sensing electrodes arranged in a matrix form and sensing lines connected to the respective sensing electrodes, and sensing a change in capacitance of a sensing electrode of a touched area when a touch of the user is generated.

The sensing electrodes SE may include a plurality of first sensing electrodes SE1 extending in the first direction DR1 of the second substrate SUB2 and applied with a sensing voltage, and a plurality of second sensing electrodes SE2 extending in the second direction DR2 intersecting with the first direction DR1. The first sensing electrodes SE1 are electrostatically coupled to the second sensing electrodes SE2, and the voltage may be changed by the electrostatic coupling.

Each of the first sensing electrodes SE1 may include a plurality of first sensing patterns SP1 arranged in the first direction DR1 and a plurality of first bridges BR1 connecting the first sensing patterns SP1 adjacent to each other. The first sensing patterns SP1 may be provided in various shapes, such as a polygonal shape including square shapes, e.g., rods, rhombs, or the like.

Each of the second sensing electrodes SE2 may include a plurality of the second sensing patterns SP2 arranged in the second direction DR2 and a plurality of second bridges BR2 connecting the second sensing patterns SP2 adjacent to each other. The second sensing patterns SP2 may also be provided in various shapes, such as a polygonal shape including square shapes, e.g., rods, rhombs, or the like. The second sensing patterns SP2 may also be provided in various shapes, such as a polygonal shape including square shapes, e.g., rods, rhombs, or the like.

The first sensing patterns SP1 and the second sensing patterns SP2 may be alternately arranged in a matrix form on the second substrate SUB2.

The first sensing patterns SP1 and the second sensing patterns SP2 may be insulated from each other. In FIG. 1, the first bridges BR1 and the second bridges BR2 have been illustrated as intersecting with each other, but actually the first bridges BR1 and the second bridges BR2 may be insulated from each other by an insulating layer IL interposed therebetween. The first sensing electrodes SE1 and the second sensing electrodes SE2 may be provided on different layers. Or the first sensing patterns SP1 and the second sensing patterns SP2 may be provided on the same layer, and the first bridges BR1 and the second bridges BR2 may be provided on different layers.

The peripheral area PA may be provided with a driving unit (not shown) for providing a sensing input signal to the sensing electrodes SE. The driving unit may provide a data signal to each of the pixels PXL through data lines.

The driving unit may be embodied on a printed circuit board, and the printed circuit board may be mounted through an FPCB or in the form of a tape carrier package. In an exemplary embodiment of the present invention, the case where the driving unit is provided in the form of the FPCB on the touch sensor TS will be described as an example.

The FPCB may be disposed on the touch sensor TS in the peripheral area PA. That is, the second pad unit TP2 may be disposed on the top surface of the second substrate SUB2 and may be electrically connected to the FPCB.

The sensing lines SL may transmit a sensing input signal from the driving unit to the first sensing electrodes SE1 and the second sensing electrodes SE2, or may transmit a sensing output signal from the first sensing electrodes SE1 and the second sensing electrodes SE2 to the driving unit.

The sensing lines SL may be connected to the sensing electrodes SE. In a plan view, the sensing lines SL may be bent several times in the peripheral area PA.

The second pad unit TP2 may be provided to transmit a signal between the sensing electrodes SE and the driving unit. The second pad unit TP2 may be provided in the peripheral area PA and connected to an end of the sensing lines SL. In FIG. 3, the second pad unit TP2 is shown as one pad unit. However, the inventive concepts are not limited thereto, and the second pad unit TP2 may be embodied as a plurality of pad units in the peripheral area PA.

The touch sensor TS may further include a protection layer PSV for insulating a structure from other structures and flattening the top surface of the touch sensor TS.

The polarization layer POL may be disposed on the touch sensor TS. The polarization layer POL may be attached to an upper surface of the touch sensor TS through a transparent adhesive or the like. The polarization layer POL may selectively transmit only light parallel to the transmission axis.

Meanwhile, the polarization layer POL may cover at least a part of the FPCB. Here, since the FPCB has a thickness, the surface of the touch sensor TS may have a height difference by the FPCB. Bubbles (dot pattern) may be generated between the polarization layer POL and the touch sensor TS in an area adjacent to the FPCB due to the height difference caused by the thickness of the FPCB. Since the bubbles result from the thickness of the FPCB, the greater the thickness of the FPCB, the greater the probability of occurrence of the bubbles. In addition, the bubbles in various forms may be viewed by a user of the display device.

In an exemplary embodiment of the present invention, the polarization layer POL may include a printed layer PL disposed on one side of the polarization layer POL to prevent the bubbles from being visible.

The printed layer PL may be provided at a position above the polarization layer POL corresponding to a region where the bubbles may occur, that is, in a region between the FPCB and the sensing area SA. For example, one end of the printed layer PL may be formed so that its boundary is parallel to a boundary between the display area DA and the non-display area NDA of the display panel DP. The other end of the printed layer PL may be extended to the outer edge of the polarization layer POL, but is not limited thereto as long as it can prevent the bubbles from being visible. The printed layer PL can effectively prevent the bubbles from being viewed from the outside.

The printed layer PL may be provided in at least a part of a region corresponding to an area where the display area DA and the sensing area SA do not overlap.

The printed layer PL may be formed by an ink method, a vapor deposition method, or a screen printing method, but is not limited thereto. The printed layer PL may be formed using a photo-curable resin composition, but is not limited thereto.

The printed layer PL may be formed of a coating layer in shades of black, but the color of the printed layer PL is not limited as long as it can prevent the bubbles from being visible. For example, the printed layer PL may be a matte color. The printed layer PL may comprise pigments having various textures.

The printed layer PL may be a single layer or a plurality of layers of two or more layers. Therefore, hue, brightness, saturation and transparency of the printed layer PL can be adjusted, and color uniformity with the adjacent structure can be obtained. The total thickness of the printed layer PL may be 100 µm or less, for example, 10 µm or less, preferably 4 µm or less. The thickness of the printed layer PL may be extremely small compared to the other structures except therefor, and may not provide any height difference.

The surface of the touch sensor TS contacting with the printed layer PL may be treated using corona, plasma, or the like. By the surface treatment, the surface-treated region of the touch sensor TS may be uneven. Thereby, the adhesive force between the upper printed layer PL and the lower touch sensor TS may be increased without changing the optical characteristics in the surface-treated region of the display device.

The printed layer PL may be extended to a region corresponding to the sensing lines SL disposed in the peripheral region PA. The printed layer PL may be formed on at least one of the three edges of the FPCB, as well as the edge of the direction where the FPCB is disposed. For example, the printed layer PL may be extended along all four corners of the polarization layer POL.

As shown in FIG. 8, when the printed layer PL is extended to an edge of the direction where the FPCB is not disposed, the printed layer PL may be provided at a position above the polarization layer POL corresponding to the sensing lines SL, instead of the bubbles. In this case, unity of the color, shape and pattern on the plan view of the display device can be ensured, and visibility of the sensing lines SL disposed on the non-display area NDA can also be prevented.

Figure 9:
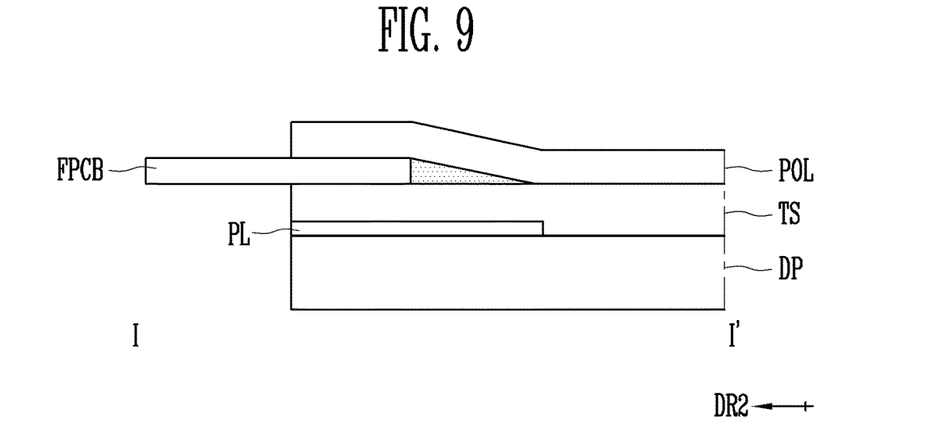
FIG. 9, FIG. 10, FIG. 11, FIG. 12, FIG. 13, FIG. 14, and FIG. 15 are other cross-sectional views taken along line I-I' of FIG. 1.

FIG. 9 shows a second cross-sectional view taken along line I-I' of FIG. 1.

Referring to FIG. 9, the display device may include the display panel DP, the touch sensor TS, the FPCB, the polarization layer POL, and the printed layer PL.

Hereinafter, the present exemplary embodiment will be mainly described with respect to the differences from the previous exemplary embodiment, and the omitted descriptions are replaced with the preceding descriptions.

The printed layer PL may be disposed between the display panel DP and the touch sensor TS corresponding to the position of the bubble. In this case, the printed layer PL is disposed below the bubbles not for the purpose of directly prevent the bubbles from being visible, but for reducing the visibility of the bubbles by preventing reflection of light irradiated on the printed layer PL.

Figure 10:
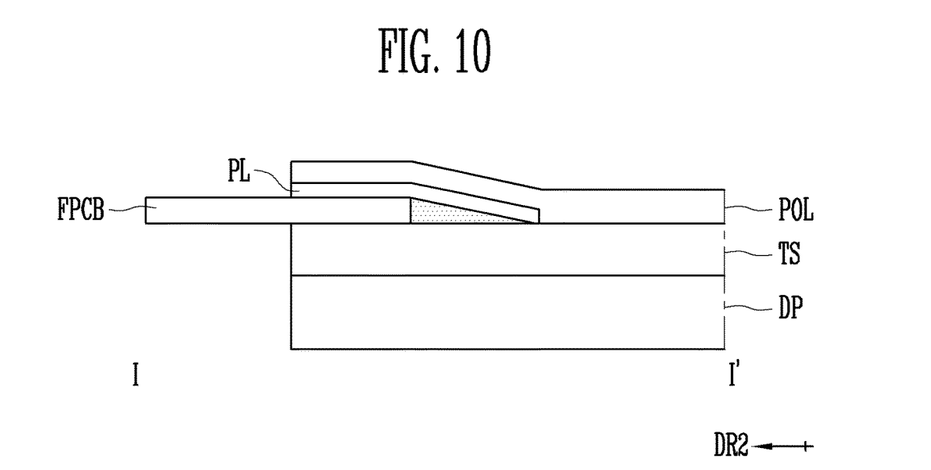

FIG. 10 shows a third cross-sectional view taken along line I-I' of FIG. 1.

Referring to FIG. 10, the display device may include the display panel DP, the touch sensor TS, the FPCB, the polarization layer POL, and the printed layer PL.

Hereinafter, the present exemplary embodiment will be mainly described with respect to the differences from the previous exemplary embodiment, and the omitted descriptions are replaced with the preceding descriptions.

The printed layer PL may be disposed between the touch sensor TS and the polarization layer POL, specifically between the FPCB and the touch sensor TS, and the polarization layer POL, corresponding to the position of the bubbles.

In a manufacturing process of the display device, when the printed layer PL is formed on the lower surface of the polarization layer POL and is then assembled on the touch sensor TS, the upper surface of the touch sensor TS may have a height difference due to the thickness of the FPCB. The height difference may generate bubbles between the touch sensor TS and the printed layer PL in an area adjacent to the FPCB. The printed layer PL may cover the bubbles from the top to prevent the bubbles from being visible from the outside.

Alternatively, in a manufacturing process of the display device, when the display device is formed by stacking sequentially from the lowermost display panel DP to the uppermost polarization layer POL, the printed layer PL may be disposed on the height difference on the touch sensor TS which is formed due to the thickness of the FPCB, and the height difference may be maintained. When the polarization layer POL is laminated on the height difference where the printed layer PL is formed, bubbles may be generated between the printed layer PL and the polarization layer POL in an area adjacent to the FPCB on which the printed layer PL is formed. In this case, the printed layer PL is disposed below the bubbles not to directly prevent the bubbles from being visible, but can reduce the visibility of the bubbles by preventing reflection of light irradiated on the printed layer PL.

Figure 11:
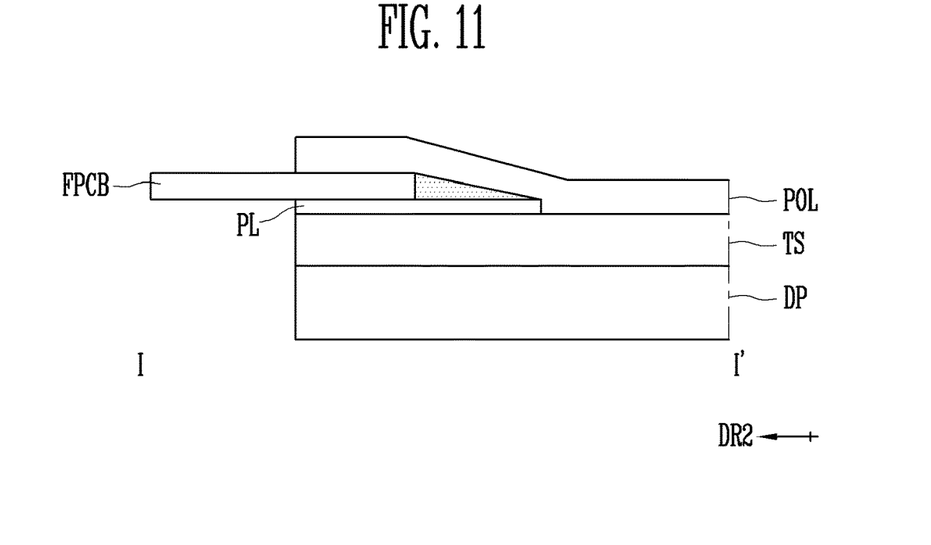

FIG. 11 shows a fourth cross-sectional view taken along line I-I' of FIG. 1.

Referring to FIG. 11, the display device may include the display panel DP, the touch sensor TS, the FPCB, the polarization layer POL, and the printed layer PL.

Hereinafter, the present embodiment will be mainly described with respect to the differences from the previous embodiment, and the omitted descriptions are replaced with the preceding descriptions.

The printed layer PL may be disposed between the touch sensor TS and the polarization layer POL, specifically between the touch sensor TS, and the FPCB and the polarization layer POL, corresponding to the position of the bubbles.

The upper surface of the printed layer PL may have a height difference due to the thickness of the FPCB. The height difference may generate bubbles between the printed layer PL and the polarization layer POL in an area adjacent to the FPCB. In this case, the printed layer PL is disposed below the bubbles not to directly prevent the bubbles from being visible, but can reduce the visibility of the bubbles by preventing reflection of light irradiated on the printed layer PL.

Figure 12:
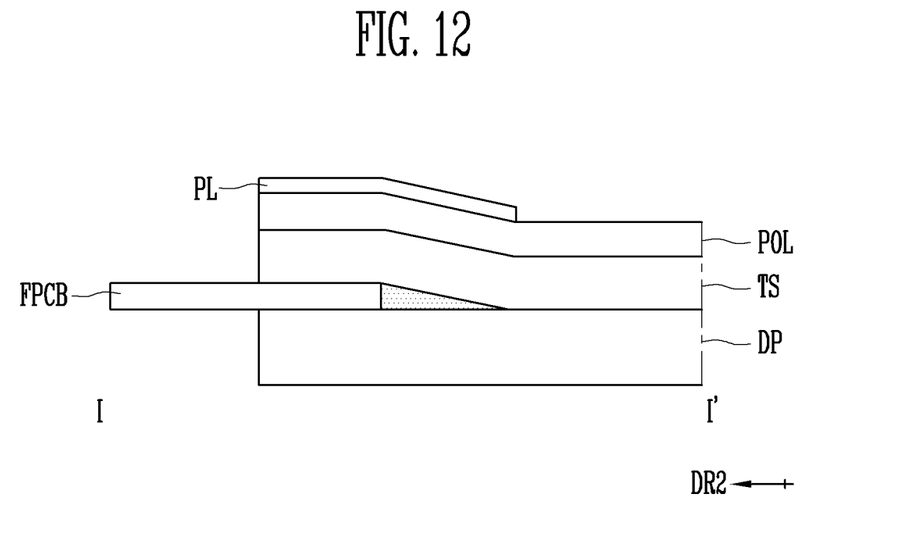

FIG. 12 shows a fifth cross-sectional view taken along line I-I' of FIG. 1.

Referring to FIG. 12, the display device may include the display panel DP, the touch sensor TS, the FPCB, the polarization layer POL, and the printed layer PL.

Hereinafter, the present exemplary embodiment will be mainly described with respect to the differences from the previous exemplary embodiment, and the omitted descriptions are replaced with the preceding descriptions.

In the display device, the FPCB may be provided under the touch sensor TS disposed on the display panel DP, that is, between the display panel DP and the touch sensor TS. Here, the second pad unit TP2 of the touch sensor TS may be provided on a lower surface of the second substrate SUB2, and may be electrically connected to the FPCB.

The lower surface of the touch sensor TS may have a height difference due to the thickness of the FPCB. The height difference may generate bubbles between the display panel DP and the touch sensor TS in an area adjacent to the FPCB.

The printed layer PL may be disposed on the polarization layer POL corresponding to the position of the bubbles, and may prevent bubbles from being visible to the user.

Figure 13:
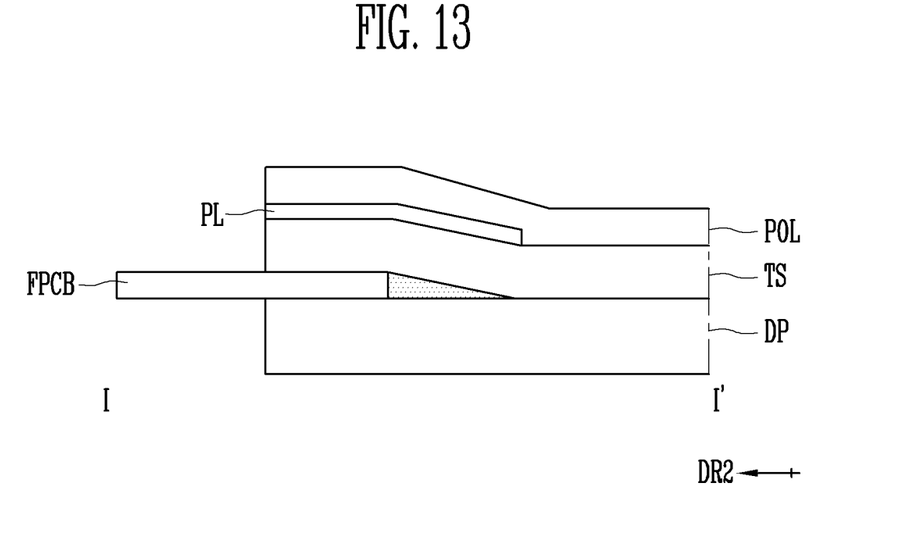

FIG. 13 shows a sixth cross-sectional view taken along line I-I' of FIG. 1.

Referring to FIG. 13, the display device may include the display panel DP, the touch sensor TS, the FPCB, the polarization layer POL, and the printed layer PL.

Hereinafter, the present exemplary embodiment will be mainly described with respect to the differences from the previous exemplary embodiment, and the omitted descriptions are replaced with the preceding descriptions.

In the display device, the FPCB may be provided under the touch sensor TS disposed on the display panel DP, that is, between the display panel DP and the touch sensor TS. Here, the second pad unit TP2 of the touch sensor TS may be disposed on a lower surface of the second substrate SUB2, and may be electrically connected to the FPCB.

The lower surface of the touch sensor TS may have a height difference due to the thickness of the FPCB. The height difference may generate bubbles between the display panel DP and the touch sensor TS in an area adjacent to the FPCB.

The printed layer PL may be disposed between the touch sensor TS and the polarization layer POL corresponding to the position of the bubbles, and may prevent the bubbles from being visible to the user.

Figure 14:
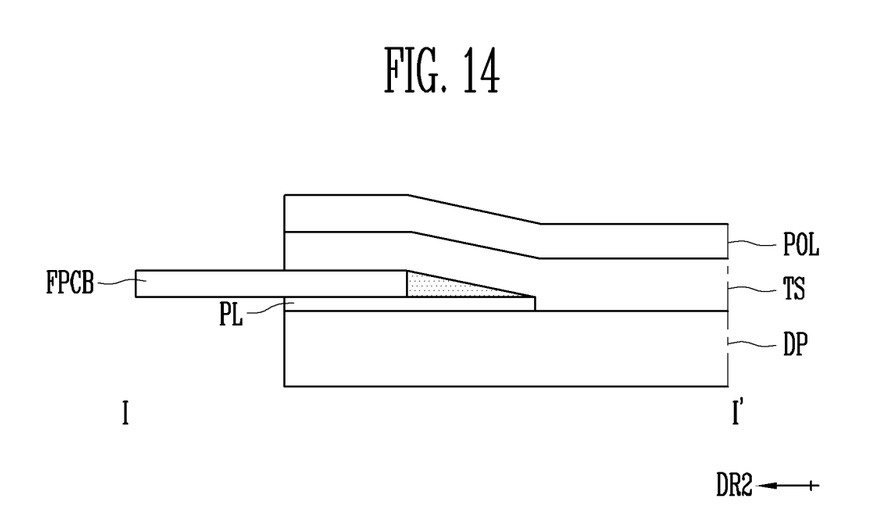

FIG. 14 shows a seventh cross-sectional view taken along line I-I' of FIG. 1.

Referring to FIG. 14, a display device may include the display panel DP, the touch sensor TS, the FPCB, the polarization layer POL, and the printed layer PL.

Hereinafter, the present exemplary embodiment will be mainly described with respect to the differences from the previous exemplary embodiment, and the omitted descriptions are replaced with the preceding descriptions.

In the display device, the FPCB may be provided under the touch sensor TS disposed on the display panel DP, that is, between the display panel DP and the touch sensor TS. Here, the second pad unit TP2 of the touch sensor TS may be disposed on a lower surface of the second substrate SUB2, and may be electrically connected to the FPCB.

The printed layer PL may be disposed between the display panel DP and the touch sensor TS, specifically between the display panel DP and the FPCB PCB, corresponding to the position of the bubbles.

The upper surface of the printed layer PL may have a height difference due to the thickness of the FPCB. The height difference may generate bubbles between the printed layer PL and the touch sensor TS in an area adjacent to the FPCB. In this case, the printed layer PL is disposed below the bubbles, which, although not directly preventing the bubbles from being visible, may reduce the visibility of the bubbles by preventing reflection of light irradiated on the printed layer PL.

Figure 15:
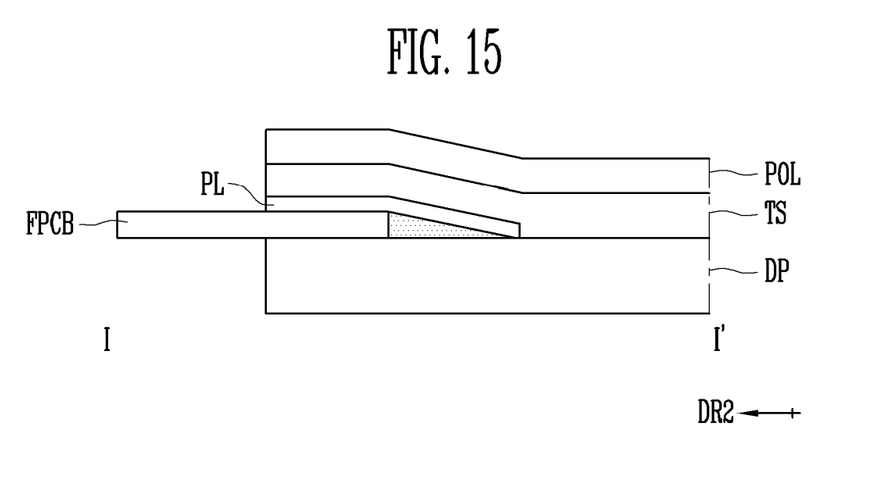

FIG. 15 shows another cross-sectional view taken along line I-I' of FIG. 1.

Referring to FIG. 15, the display device may include the display panel DP, the touch sensor TS, the FPCB, the polarization layer POL, and the printed layer PL.

Hereinafter, the present exemplary embodiment will be mainly described with respect to the differences from the previous exemplary embodiment, and the omitted descriptions are replaced with the preceding descriptions.

In the display device, the FPCB may be provided under the touch sensor TS disposed on the display panel DP, that is, between the display panel DP and the touch sensor TS. Here, the second pad unit TP2 of the touch sensor TS may be disposed on a lower surface of the second substrate SUB2, and may be electrically connected to the FPCB.

The printed layer PL may be disposed between the touch sensor TS and the display panel DP corresponding to the position of the bubbles.

In a manufacturing process of the display device, when the printed layer PL is formed on the lower surface of the touch sensor TS, specifically on the lower surface of the second substrate SUB2, and is then assembled on the FPCB, the upper surface of the display panel DP may have a height difference due to the thickness of the FPCB. The height difference may generate bubbles between the display panel DP and the printed layer PL in an area adjacent to the FPCB. The printed layer PL may cover the bubbles from the top to prevent bubbles from being visible from the outside.

Alternatively, in a manufacturing process of the display device, when the display device is formed by stacking sequentially from the lowermost display panel DP to the uppermost polarization layer POL, the printed layer PL may be provided on the height difference on the display panel DP which is formed due to the thickness of the FPCB, and the height difference may be maintained as it is. When the touch sensor TS is laminated on the height difference where the printed layer PL is formed, bubbles may be generated between the printed layer PL and the touch sensor TS in an area adjacent to the FPCB on which the printed layer PL is formed. In this case, the printed layer PL is disposed below the bubbles, which, although not directly preventing the bubbles from being visible, may reduce the visibility of the bubbles by preventing reflection of light irradiated on the printed layer PL.

The display device according to an exemplary embodiment of the present invention can prevent the visibility of bubbles generated from the stacked structure of an FPCB and a polarization layer.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device, comprising:
    a display panel comprising a display area and a non-display area disposed around the display area;
    a touch sensor disposed on the display panel, the touch sensor comprising a sensing area corresponding to the display area, a peripheral area corresponding to the non-display area, and a pad unit disposed on a part of the peripheral area;
    a flexible printed circuit board disposed on the touch sensor in the peripheral area and connected to the pad unit;
    a polarization layer disposed on the touch sensor and a part of the flexible printed circuit board; and
    a printed layer disposed on at least an area between the flexible printed circuit board and the sensing area,
    wherein:
    the printed layer includes a first region and a second region;
    the flexible printed circuit board, the touch sensor, and the printed layer overlap in the first region;
    the touch sensor and the printed layer overlap in the second region; and
    the flexible printed circuit board is not in the second region.

2. The display device according to claim 1, wherein the printed layer is disposed on the polarization layer.

3. The display device according to claim 1, wherein the printed layer is disposed between the display panel and the touch sensor.

4. The display device according to claim 1, wherein the printed layer is disposed between the touch sensor and the polarization layer.

5. The display device according to claim 1, wherein the printed layer is extended to an outside of the polarization layer.

6. The display device according to claim 1, wherein the printed layer is extended to an area corresponding to sensing lines disposed on the peripheral area.

7. The display device according to claim 1, wherein the presence of the printed layer in the second region prevents bubbles generated due to a height difference produced by the flexible printed circuit board from being visible from the outside.

8. A display device, comprising:
a display panel comprising a display area and a non-display area disposed around the display area;
a touch sensor disposed on the display panel, the touch sensor comprising a sensing area corresponding to the display area, a peripheral area corresponding to the non-display area, and a pad unit disposed on a part of the peripheral area;
a flexible printed circuit board disposed between the display panel and the touch sensor in the peripheral area and connected to the pad unit;
a polarization layer disposed on the touch sensor; and
a printed layer disposed on at least an area between the flexible printed circuit board and the sensing area, wherein:
the printed layer includes a first region and a second region;
the flexible printed circuit board, the touch sensor, and the printed layer overlap in the first region;
the touch sensor and the printed layer overlap in the second region; and
the flexible printed circuit board is not in the second region.

9. The display device according to claim 8, wherein the printed layer is disposed on the polarization layer.

10. The display device according to claim 8, wherein the printed layer is disposed between the display panel and the touch sensor.

11. The display device according to claim 8, wherein the printed layer is disposed between the display panel and the touch sensor.

12. The display device according to claim 8, wherein the printed layer is extended to an outside of the polarization layer.

13. The display device according to claim 8, wherein the printed layer is extended to an area corresponding to sensing lines disposed on the peripheral area.

* * * * *